(12) United States Patent
Sherwood et al.

(10) Patent No.: US 10,906,576 B2
(45) Date of Patent: Feb. 2, 2021

(54) ANTI-ROTATION FEATURE FOR STEERING COLUMN TELESCOPE DRIVE ASSEMBLY

(71) Applicant: Steering Solutions IP Holding Corporation, Saginaw, MI (US)

(72) Inventors: Jarrod C. Sherwood, Vassar, MI (US); Robert D. Maida, Pinconning, MI (US); Harmony J. Hudnall, Montrose, MI (US); Brian K. Rood, Corunna, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 181 days.

(21) Appl. No.: 16/198,115

(22) Filed: Nov. 21, 2018

(65) Prior Publication Data

US 2020/0156692 A1    May 21, 2020

(51) Int. Cl.
| | |
|---|---|
| *B62D 1/181* | (2006.01) |
| *B62D 1/187* | (2006.01) |
| *B62D 1/189* | (2006.01) |
| *F16H 25/20* | (2006.01) |
| *B62D 1/185* | (2006.01) |

(52) U.S. Cl.
CPC ............. *B62D 1/181* (2013.01); *B62D 1/185* (2013.01); *B62D 1/187* (2013.01); *B62D 1/189* (2013.01); *F16H 25/20* (2013.01); *F16H 2025/204* (2013.01)

(58) Field of Classification Search
CPC ........ B62D 1/181; B62D 1/187; B62D 1/189; B62D 1/185
See application file for complete search history.

(56) References Cited

U.S. PATENT DOCUMENTS

| | | | |
|---|---|---|---|
| 5,588,332 A | 12/1996 | Hedderly | |
| 6,079,743 A | 6/2000 | Grams | |
| 7,159,904 B2 * | 1/2007 | Schafer | B62D 1/181 280/775 |
| 9,022,427 B2 | 5/2015 | Schnitzer | |
| 2009/0174177 A1 | 7/2009 | Gerzseny et al. | |
| 2013/0276569 A1 | 10/2013 | Davies et al. | |
| 2014/0069223 A1 | 3/2014 | Bang | |
| 2015/0232117 A1 | 8/2015 | Stinebring et al. | |

(Continued)

FOREIGN PATENT DOCUMENTS

DE    102017201594 A1 *  8/2018  ............. B62D 1/181

*Primary Examiner* — Luis A Gonzalez
(74) *Attorney, Agent, or Firm* — Dickinson Wright PLLC

(57) ABSTRACT

A telescope drive assembly for a steering column assembly includes a column jacket moveable in a rake direction and defining a tapered slot. The telescope drive assembly also includes a telescope actuator assembly operatively coupled to the column jacket to move the column jacket in a telescope direction. The telescope drive assembly further includes a telescope drive bracket operatively coupled to the telescope actuator assembly and to the column jacket, the telescope drive bracket and the column jacket rotatable about a common axis in the rake direction. The telescope drive assembly yet further includes a telescope guide disposed between the telescope drive bracket and the column jacket, the telescope guide disposed at least partially within the tapered slot and translatable within the tapered slot in the telescope direction.

18 Claims, 7 Drawing Sheets

(56) References Cited

U.S. PATENT DOCUMENTS

| | | |
|---|---|---|
| 2015/0251683 A1 | 9/2015 | Caverly et al. |
| 2015/0375770 A1 | 12/2015 | Buzzard et al. |
| 2016/0039450 A1 | 2/2016 | Johta et al. |
| 2016/0167695 A1 | 6/2016 | Hagiwara et al. |
| 2016/0252133 A1 | 9/2016 | Caverly |
| 2016/0375929 A1* | 12/2016 | Rouleau ................. B62D 1/181 74/493 |
| 2018/0086363 A1 | 3/2018 | Stinebring et al. |
| 2019/0367071 A1* | 12/2019 | Schacht ................. F16C 19/06 |

* cited by examiner

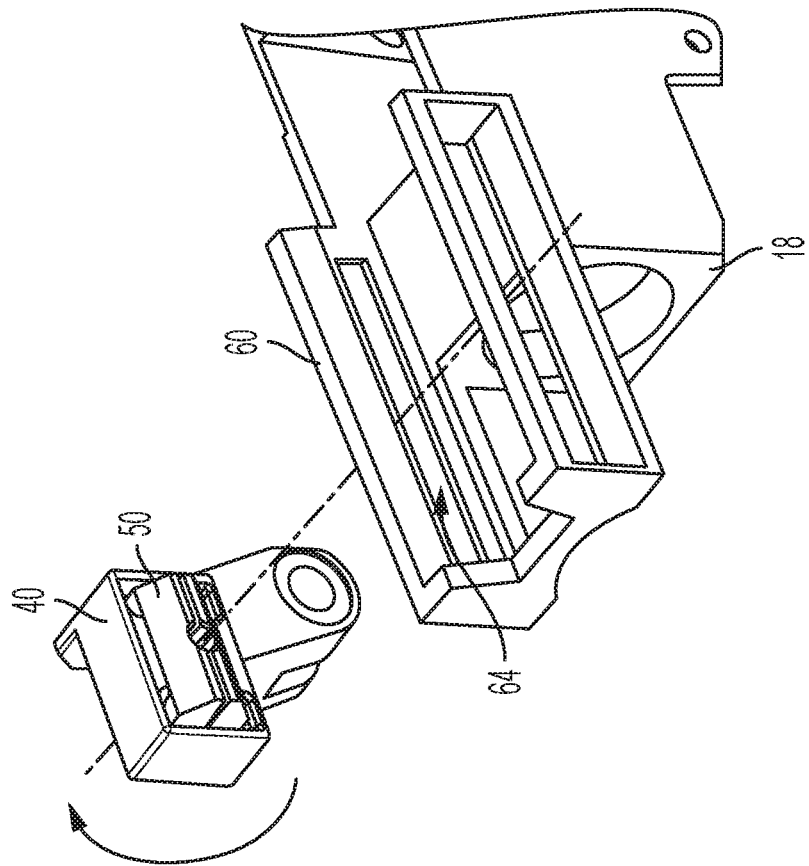
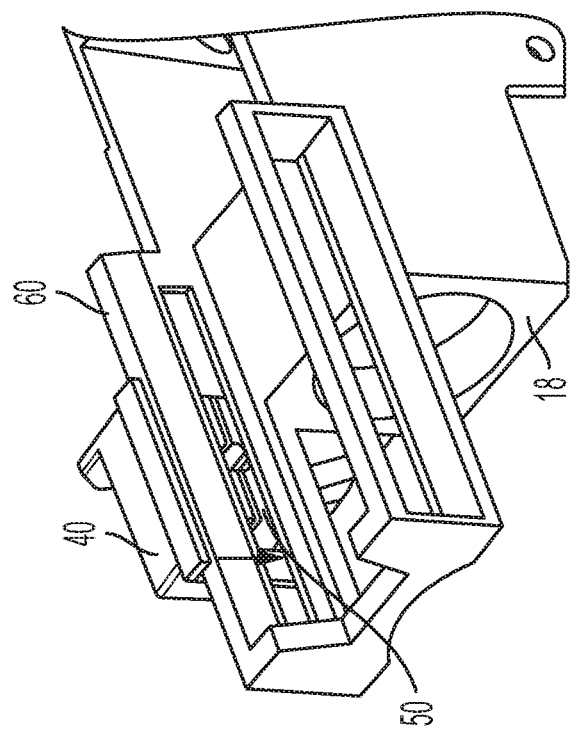
FIG. 8
FIG. 9

ANTI-ROTATION FEATURE FOR STEERING COLUMN TELESCOPE DRIVE ASSEMBLY

BACKGROUND

The embodiments described herein relate to vehicle steering systems and, more particularly, to an anti-rotation feature for a telescope drive assembly.

A steering column assembly of a vehicle may be adjustable in a rake (tilt) direction and in a telescoping direction. Each of these adjustments may be carried out with respective power assemblies or mechanisms. Typical telescope drive systems may include a cast aluminum, or stamped steel, component mounted to a column jacket which constrains a jackscrew nut of a telescope actuator assembly. The telescope actuator assembly is mounted rigidly at one location thereof, while another location moves in a linear direction, thus driving the component it is fixed to, resulting in a desired telescope travel. In some cases, the rigid attachment point for the telescope actuator bracket, or any rigidly attached bracket, may not be in line with the actuation load direction. In these cases, undesirable reaction forces during linear movement causes a moment that may cause the telescope actuator assembly to rotate during telescopic actuation.

SUMMARY

According to one aspect of the disclosure, a telescope drive assembly for a steering column assembly includes a column jacket moveable in a rake direction and defining a tapered slot. The telescope drive assembly also includes a telescope actuator assembly operatively coupled to the column jacket to move the column jacket in a telescope direction. The telescope drive assembly further includes a telescope drive bracket operatively coupled to the telescope actuator assembly and to the column jacket, the telescope drive bracket and the column jacket rotatable about a common axis in the rake direction. The telescope drive assembly yet further includes a telescope guide disposed between the telescope drive bracket and the column jacket, the telescope guide disposed at least partially within the tapered slot and translatable within the tapered slot in the telescope direction.

According to another aspect of the disclosure, a telescope drive assembly for a steering column assembly includes a column jacket moveable in a rake direction. The telescope drive assembly also includes a telescope actuator assembly operatively coupled to the column jacket to actuator movement of at least a portion of the column jacket in a telescope direction, the telescope actuator assembly and the column jacket rotatable about a common axis in the rake direction, the telescope actuator assembly not rotatable during movement of the column jacket in the telescope direction.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 8 is a perspective view of the telescope guide and the telescope drive bracket disassembled from a jacket of the steering column assembly; and FIG. 9 is a perspective view of the telescope guide and the telescope drive bracket assembled to the jacket.

DETAILED DESCRIPTION

Figure 1:
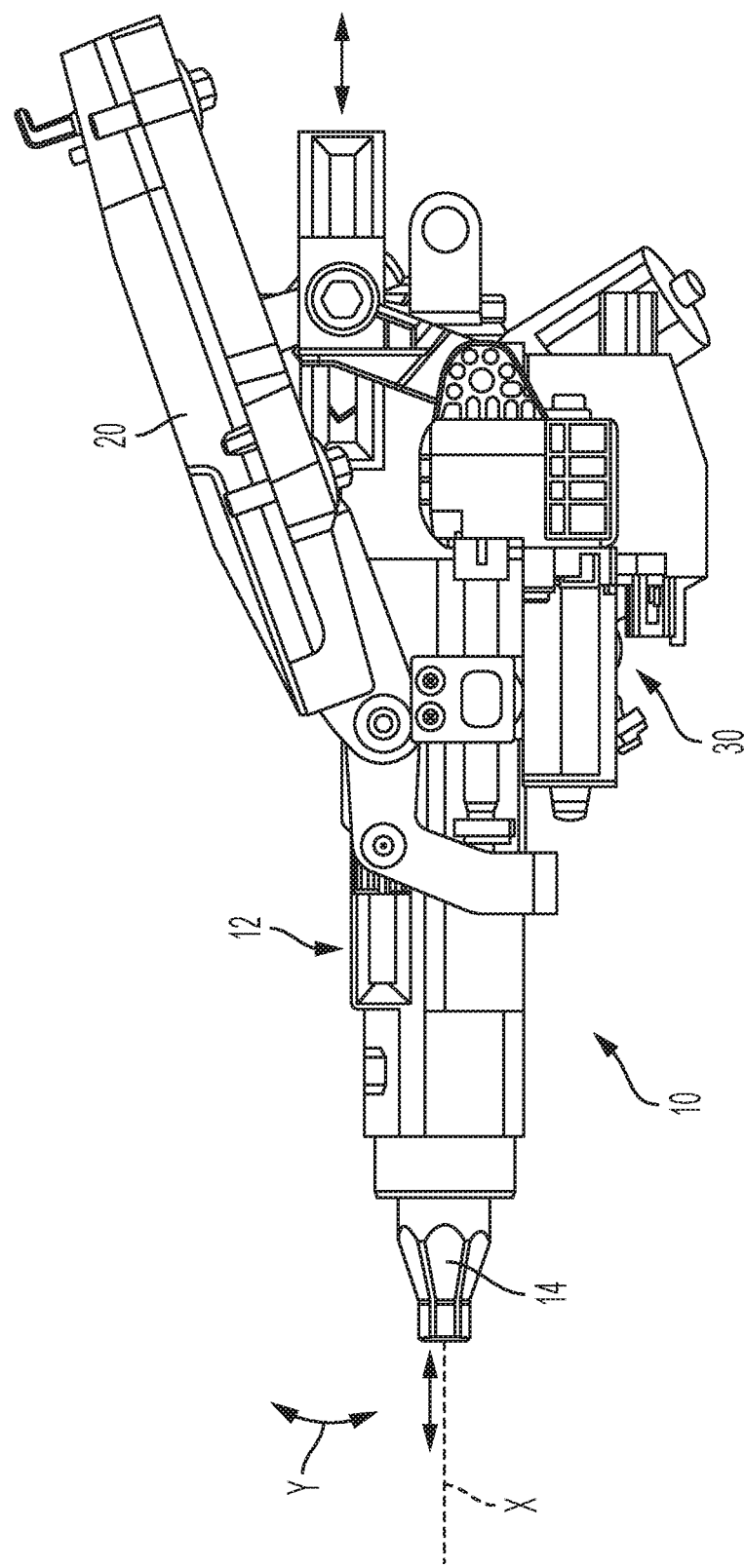
FIG. 1 is a side, elevational view of a steering column assembly in a first position.

Referring now to the FIGURES, where the invention will be described with reference to specific embodiments, without limiting same, FIG. 1 illustrates a steering column assembly generally indicated with numeral 10. The steering column assembly 10 is for a vehicle and extends along a longitudinal axis X. The steering column assembly 10 is adjustable in both a rake direction Y generally transverse to the longitudinal axis X (tilt) and a telescopic direction generally parallel with the longitudinal axis X (i.e., adjustable along the longitudinal axis X). The steering column assembly 10 includes a column jacket 12 and a steering shaft 14 extending along the longitudinal axis X. The mounting bracket assembly 20 and column jacket 12 are in telescopic engagement with each other in some embodiments, such as the illustrated embodiment. A mounting bracket assembly 20 facilitates attachment of the column jacket assembly 12 to a vehicle.

Figure 2:
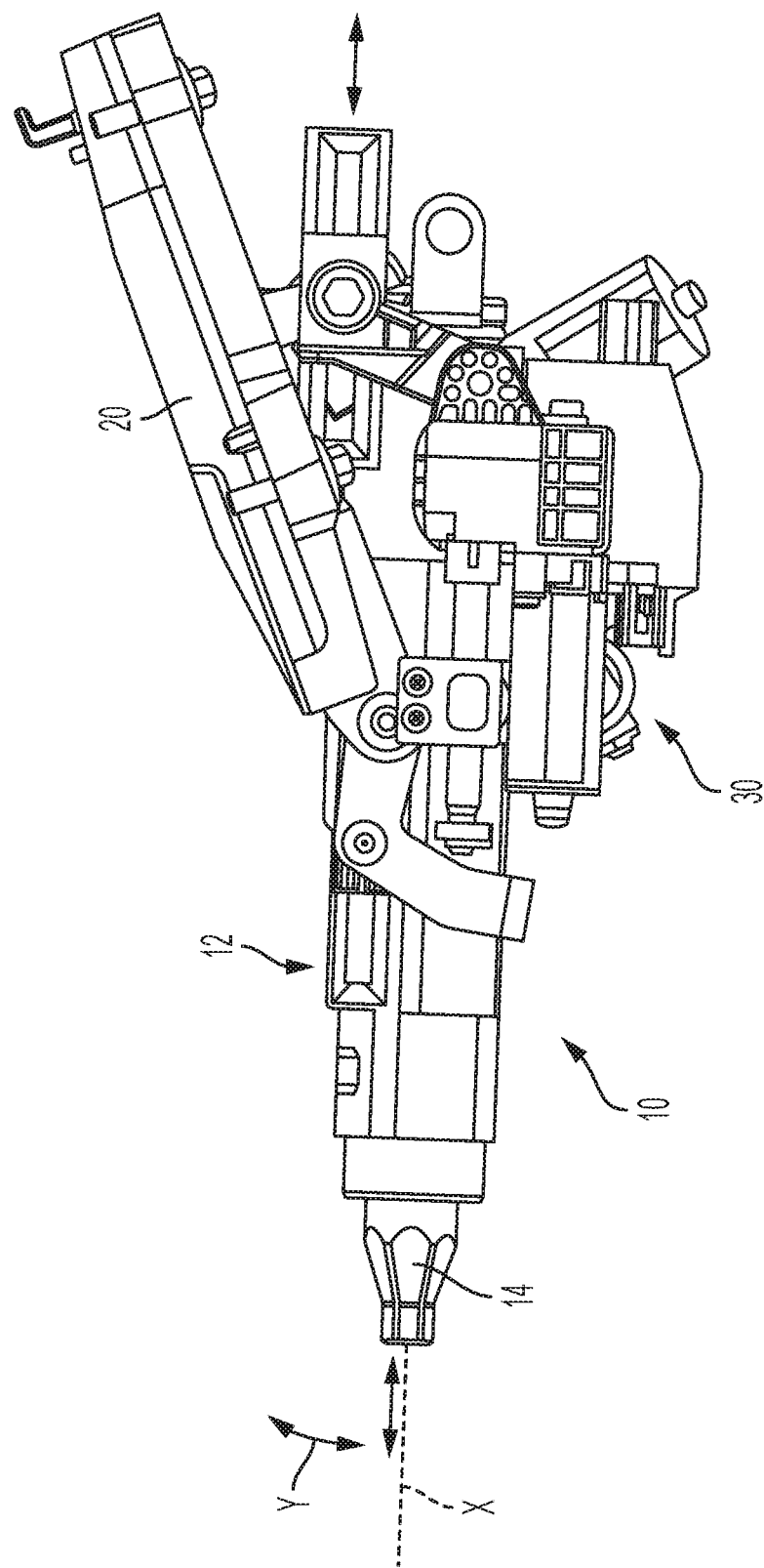
FIG. 2 is a side, elevational view of a steering column assembly in a second position.
Figure 3:
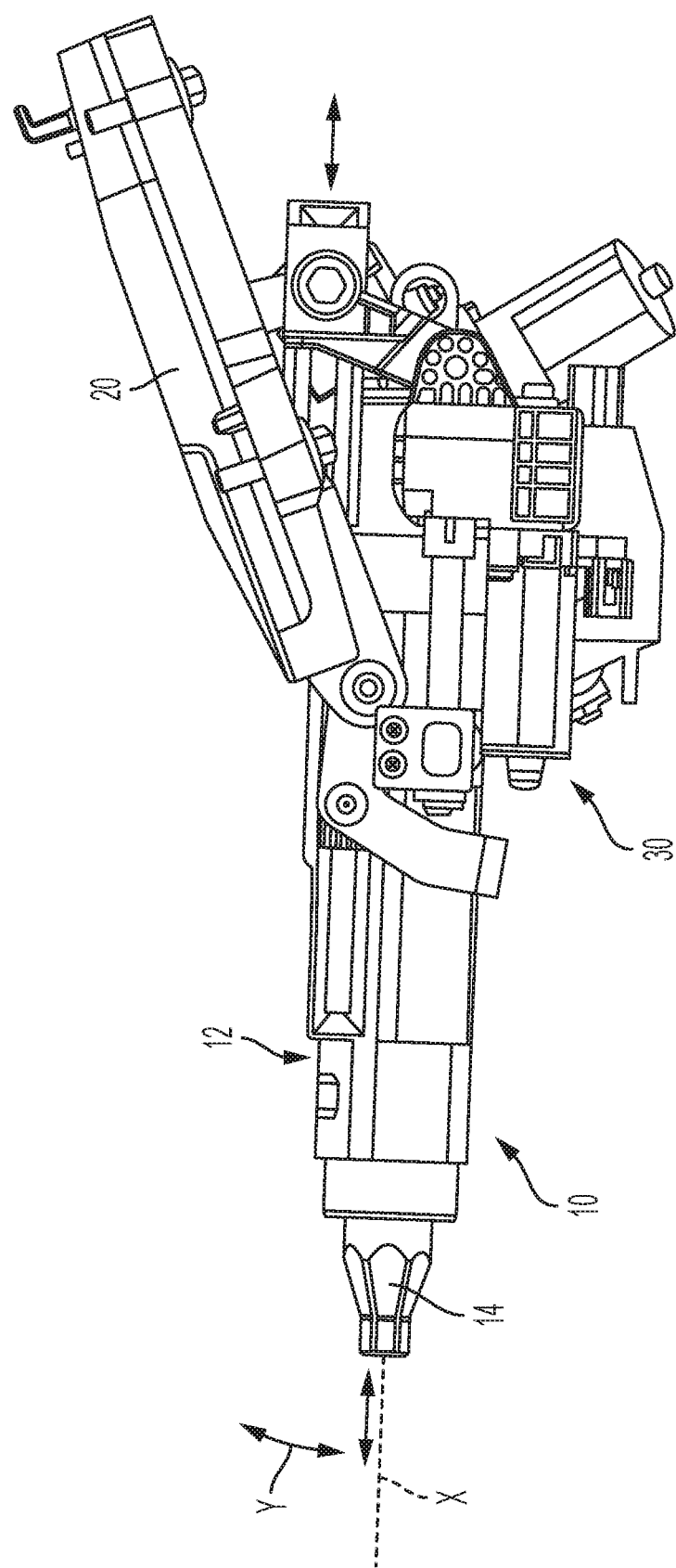
FIG. 3 is a side, elevational view of a steering column assembly in a third position.

FIG. 1 illustrates the steering column assembly 10 in a first position, which may be referred to as a nominal position for purposes of positional reference herein. FIG. 2 illustrates the steering column assembly 10 in a "rake up" position, which refers to a position of the assembly 10 after being tilted up from the nominal position. FIG. 3 illustrates the steering column assembly 10 in the rake up position and a "telescope out" position, which refers to linear movement of the assembly 10 in a manner that extends the assembly. Movement to and from each of these positions, as well as other rake and telescope positions, is carried out with respective power actuation assemblies. Each of FIGS. 1-3 show a telescope actuator assembly 30, but a view of rake actuator assembly is obscured, as it is located on an opposite side of the steering column assembly 10. It is noted that the telescope actuator assembly 30 and the column jacket 12, and therefore the steering shaft 14, rotate about a common axis, referred to with character A in FIG. 4.

Figure 4:
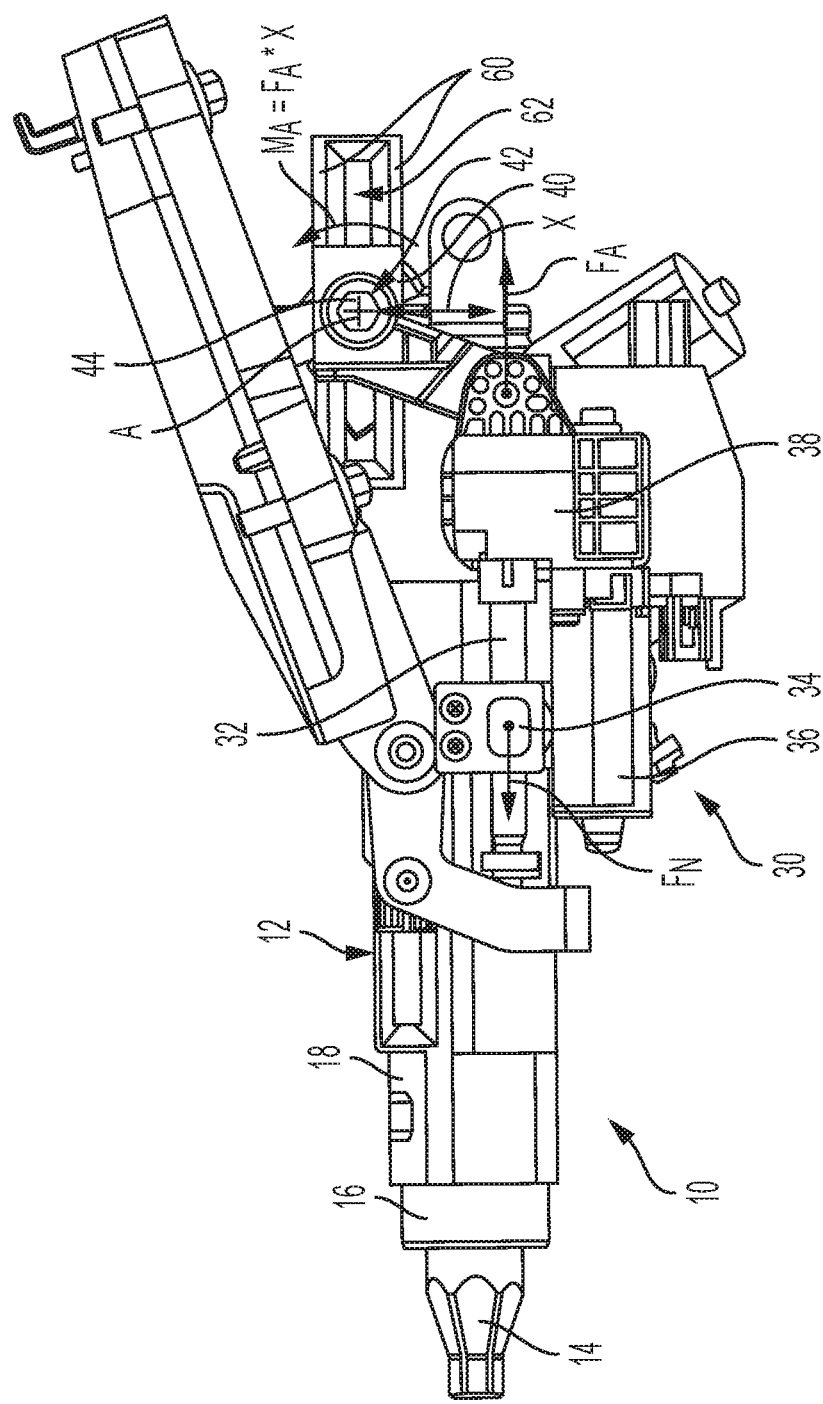
FIG. 4 is a side, elevational view of a steering column assembly illustrating forces associated with a powered telescope maneuver.

Referring now to FIG. 4, the steering column assembly 10 is shown once again in the nominal position of FIG. 1, but shows certain forces associated with power telescoping actuation with telescope actuator assembly 30. The telescope actuator assembly 30 includes a leadscrew 32 having a nut 34 threaded thereto. A motor 36 drives the leadscrew 32 to translate the nut 34 therealong. The nut 34 is operatively coupled to the column jacket 12, such that linear movement of the nut 34 along the leadscrew 32 drives the column jacket 12 to and from different telescope positions. The telescope actuator assembly 30 also includes an actuator body 38 that is operatively coupled to the motor 36. The overall telescope actuator assembly 30 remains stationary while the nut 34 translates on the leadscrew 32. During movement of the nut 34, the nut drives the column jacket 12 with a force $F_N$. The actuator body 38 applies an equal and opposite force $F_A$ to a telescope drive bracket 40, to which the actuator body 38 is operatively coupled to.

The telescope drive bracket 40 includes a portion that defines an aperture 42 for disposal of a rake bolt 44 therein, with the rake bolt 44 being positioned longitudinally along axis A. The telescope drive bracket 40 is therefore pivotable about axis A, which is the common axis that the column jacket 12 is pivotable about for raking or tilting motion. Therefore, the telescope drive bracket 40—and thus the telescope actuator assembly 30—and the column jacket 12 is are pivotable about common axis A. The offset of $F_A$ from the pivot axis A of the telescope drive bracket 40 creates a moment $M_A$ that must be counteracted to prevent rotation of the telescope actuator assembly 30 during motion consisting only of telescope motion.

Figure 5:
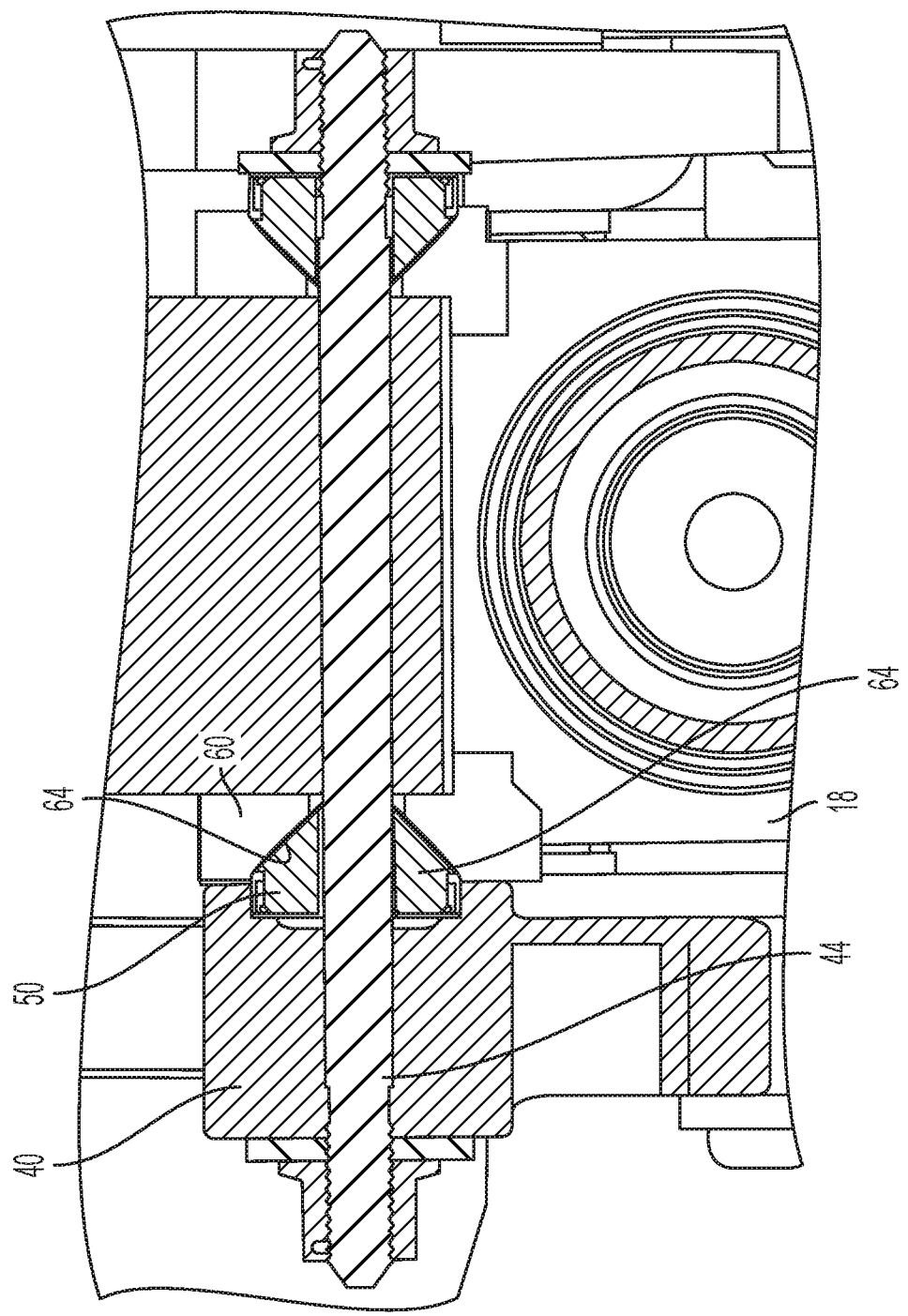
FIG. 5 is a cross-sectional view taken along line A-A of FIG. 1 showing an anti-rotation feature of the steering column assembly.
Figure 7:
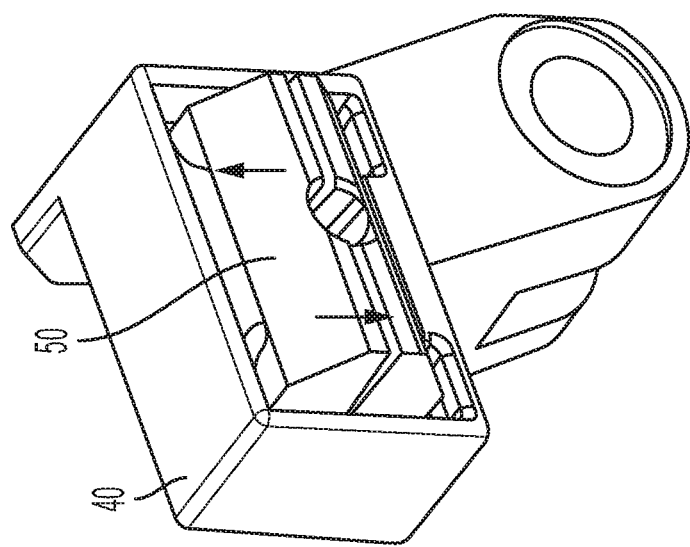
FIG. 7 is a perspective view of the telescope guide assembled with the telescope drive bracket.
Figure 6:
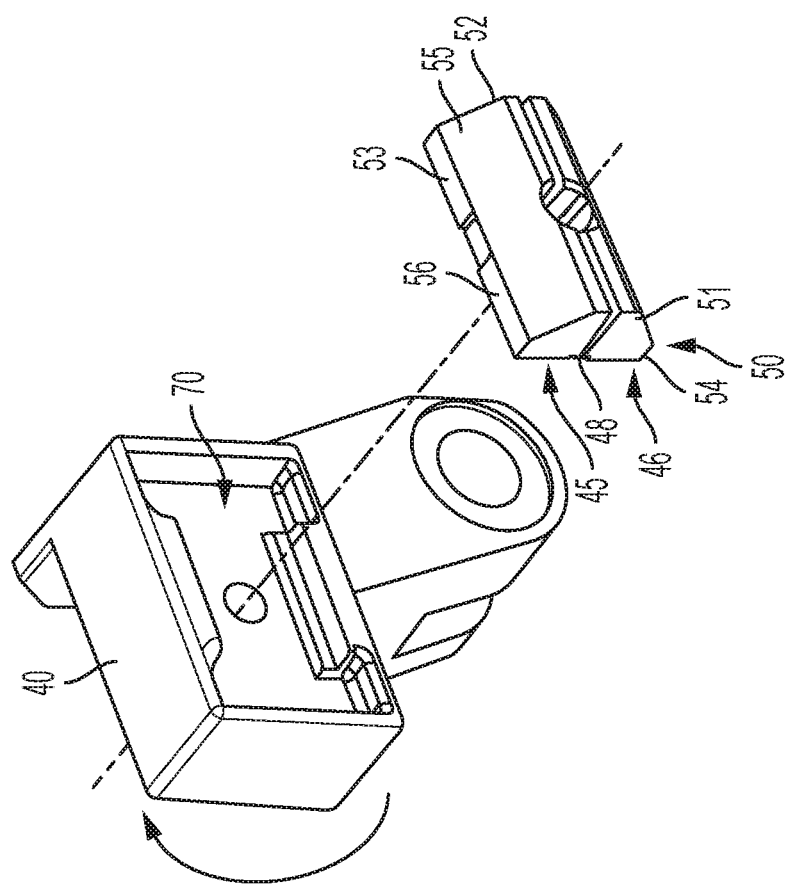
FIG. 6 is a perspective view of a telescope guide disassembled from a telescope drive bracket.

Referring now to FIGS. 5-7, an anti-rotation feature is illustrated. As described herein, the anti-rotation feature prevents rotation of the telescope drive bracket 40, and therefore the telescope actuator assembly 30 to which the bracket 40 is coupled, during adjustment consisting of telescope operation only, while still allowing rotation during rake operation. In particular, to counteract the above-described moment $M_A$, the telescope drive bracket 40 is operatively coupled to a telescope guide 50 that prevents rotation, but facilitates telescoping translation.

As shown in FIGS. 4 and 5, the column jacket 12 includes a pair of rails 60 that define a tapered slot 62. The tapered slot 62 substantially extends in a longitudinal direction of the column jacket 12. Each of the pair of rails 60 includes a tapered wall 64 having at least one angled portion. The tapered walls 64 diverge from each other in a direction away from axis A. The telescope guide 50 is rigidly fixed to the telescope drive bracket 40 (FIGS. 5-7) and disposed between the telescope drive bracket 40 and the column jacket 12. In particular, the telescope guide 50 is at least partially disposed within the tapered slot 62. The telescope guide 50 defines a rake bolt aperture to receive the rake bolt 44 therethrough.

Referring to FIGS. 5-7, the telescope guide 50 includes a first portion 45 and a second portion 46 that are flexibly connected to each other with a hinge 48. In the illustrated embodiment, the first and second portions 45, 46 are halves of the rake guide, but it is contemplated that one portion may account for more of the total area than the other portion in alternative embodiments. The telescope guide 50 extends from a first side 51 to a second side 52, from a top edge 53 to a bottom edge 54, and from a first wall 55 to a second wall 56. As discussed above, the telescope guide 50 is at least partially disposed within the tapered slot 62. Seating of the telescope guide 50 within the tapered slot 62 is facilitated by the corresponding tapered geometry of the slot walls 64 and the first wall 55 of the telescope guide 50. In the illustrated embodiment, two tapered wall segments of the telescope guide 50 are included to form a substantially trapezoidal geometry of the telescope guide 50. Disposal of the telescope guide 50 within the tapered slot 62 allows the telescope guide 50 to translate axially, but rotational motion is constrained by the corresponding wall geometries described above.

The distance from the first side 51 to the second side 52 of the telescope guide 50 defines a length of the telescope guide 50. The hinge 48 extends along the length of the rake guide. In some embodiments, the hinge 48 extends along an entire length thereof. In the illustrated embodiment, the hinge 48 is a ribbed feature that terminates at ends that are recessed from the first wall 55 of the telescope guide 50. In another embodiment of the telescope guide 50, a hinge 48 is a wall that is flush with the entire first wall 55 of the telescope guide 50 to provide a single, flush wall.

As shown in FIG. 7, the telescope guide 50 resists rotation when seated within, and rigidly coupled to, the telescope drive bracket 40. The telescope drive bracket 40 includes a recess, such as a rectangular pocket 70 that receives a portion of the telescope guide 50. FIGS. 8 and 9 illustrate another embodiment, where the moment $M_A$ is counteracted by rigidly coupling (e.g., locking) the telescope drive bracket 40 to at least one of the rails 60 of the column jacket 12. Either embodiment counteracts the moment $M_A$ caused during telescope movement, thereby functioning as an anti-rotation feature for the telescope actuator assembly 30.

The embodiments disclosed herein allow the telescope drive bracket 40, the telescope actuator assembly 30 and the column jacket 12 to rotate as one member about common axis A during rake motion, but the telescope drive bracket 40 cannot rotate during telescope only motion.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A telescope drive assembly for a steering column assembly comprising:
    a column jacket moveable in a rake direction and defining a tapered slot;
    a telescope actuator assembly operatively coupled to the column jacket to move the column jacket in a telescope direction;
    a telescope drive bracket operatively coupled to the telescope actuator assembly and to the column jacket, the telescope drive bracket and the column jacket rotatable about a common axis in the rake direction; and
    a telescope guide disposed between the telescope drive bracket and the column jacket, the telescope guide disposed at least partially within the tapered slot and translatable within the tapered slot in the telescope direction.

2. The telescope drive assembly of claim 1, wherein the telescope guide is rigidly coupled to the telescope drive bracket.

3. The telescope drive assembly of claim 1, wherein the telescope drive bracket is rigidly coupled to a rail of the column jacket, the rail at least partially defining the tapered slot.

4. The telescope drive assembly of claim 1, wherein the telescope actuator assembly comprises:
    an actuator body operatively coupled to the telescope drive bracket;
    a motor operatively coupled to the actuator body;
    a leadscrew driven by the motor; and a nut in threaded engagement with the leadscrew and coupled to the column jacket, the nut moveable along the leadscrew to drive the column jacket in the telescope direction.

5. The telescope drive assembly of claim 1, wherein the telescope guide comprises a first portion and a second portion flexibly connected to each other with a hinge.

6. The telescope drive assembly of claim 5, wherein the hinge extends along an entire length of the telescope guide.

7. The telescope drive assembly of claim 6, wherein the hinge terminates at first and second edges recessed from a wall of the telescope guide to define outer contact pads engaged with walls of the tapered slot.

8. The telescope drive assembly of claim 6, wherein the hinge is flush with a wall of the telescope guide to define a single, flush wall.

9. The telescope drive assembly of claim 1, wherein the telescope guide comprises at least one tapered wall corresponding to geometry of the tapered slot.

10. The telescope drive assembly of claim 1, wherein the telescope guide is formed of a trapezoidal geometry.

11. The telescope drive assembly of claim 1, wherein the telescope guide includes an aperture wall defining a rake bolt aperture for receiving a rake bolt therethrough.

12. A telescope drive assembly for a steering column assembly comprising:
a column jacket moveable in a rake direction; and
a telescope actuator assembly operatively coupled to the column jacket to actuator movement of at least a portion of the column jacket in a telescope direction, the telescope actuator assembly and the column jacket rotatable about a common axis in the rake direction, the telescope actuator assembly not rotatable during movement of the column jacket in the telescope direction, the telescope actuator assembly comprising:
 a telescope drive bracket operatively coupled to the column jacket;
 a telescope guide disposed between the telescope drive bracket and the column jacket, the telescope guide disposed at least partially within a tapered slot defined by the column jacket and translatable within the tapered slot in the telescope direction;
 an actuator body operatively coupled to the telescope drive bracket;
 a motor operatively coupled to the actuator body;
 a leadscrew driven by the motor; and
 a nut in threaded engagement with the leadscrew and coupled to the column jacket, the nut moveable along the leadscrew to drive the column jacket in the telescope direction.

13. The telescope drive assembly of claim 12, wherein the telescope guide is rigidly coupled to the telescope drive bracket.

14. The telescope drive assembly of claim 12, wherein the telescope drive bracket is rigidly coupled to a rail of the column jacket, the rail at least partially defining the tapered slot.

15. The telescope drive assembly of claim 12, wherein the telescope guide comprises a first portion and a second portion flexibly connected to each other with a hinge.

16. The telescope drive assembly of claim 12, wherein the telescope guide comprises at least one tapered wall corresponding to geometry of the tapered slot.

17. The telescope drive assembly of claim 12, wherein the telescope guide is formed of a trapezoidal geometry.

18. The telescope drive assembly of claim 12, wherein the telescope guide includes an aperture wall defining a rake bolt aperture for receiving a rake bolt therethrough.

\* \* \* \* \*